J. Crozer.
Bee Hive.

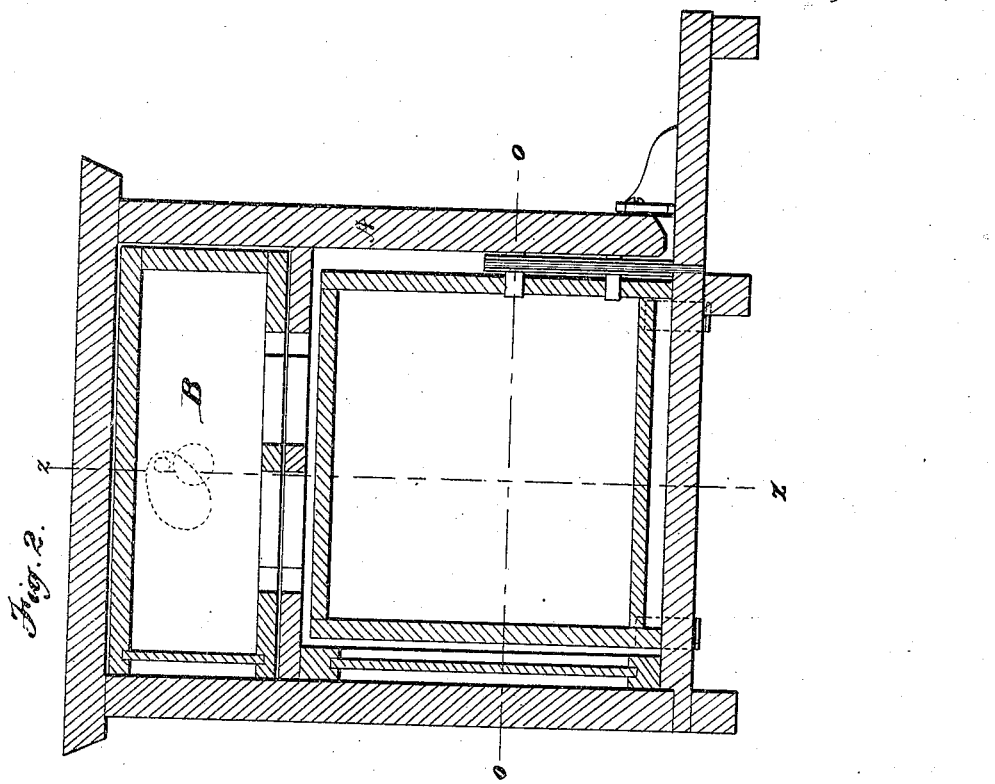
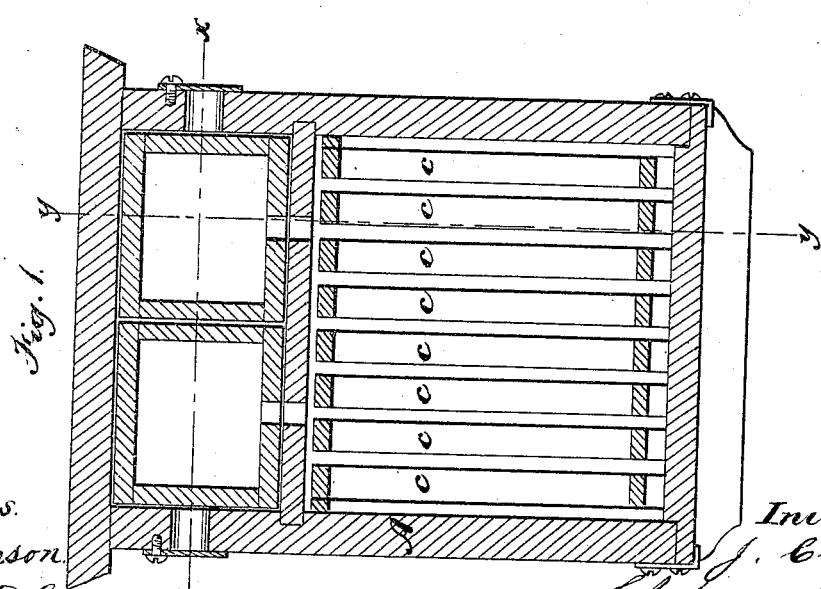

Nº 92,018.   Patented Jan. 29, 1869.

Witnesses
E. W. Anderson
James P. Graves

Inventor.
J. Crozer
Chipman Hosmer & Co
Atty

United States Patent Office.

JOSEPH CRONER, OF CROSS CREEK VILLAGE, PENNSYLVANIA.

Letters Patent No. 92,018, dated June 29, 1869.

IMPROVEMENT IN BEE-HIVES.

The Schedule referred to in these Letters Patent and making part of the same.

*To all whom it may concern:*

Be it known that I, JOSEPH CRONER, of Cross Creek Village, in the county of Washington, and State of Pennsylvania, have invented a new and valuable Improvement in Movable-Comb Bee-Palace; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of a vertical section of my invention, looking from the door, back.

Figure 2 is a longitudinal section of the same.

My invention relates to bee-hives; and

Figure 5:
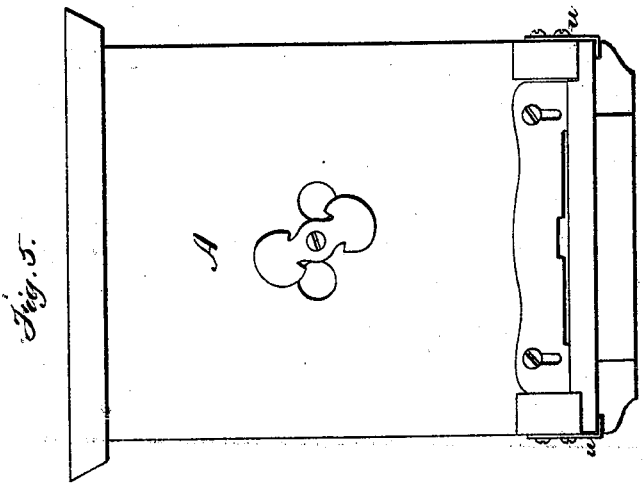
Figure 5 is an external elevation of the rear end of the same.
Figure 4:
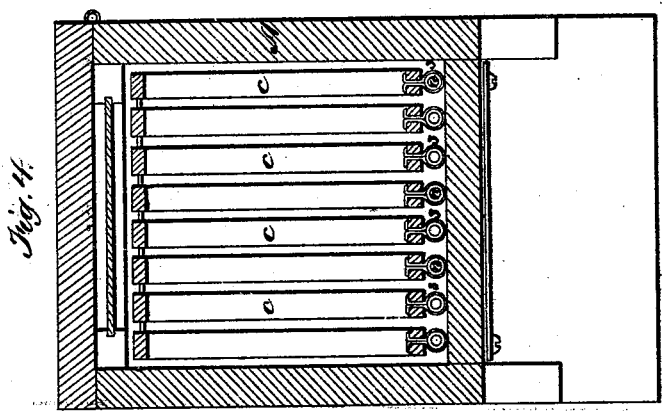
Figure 4 is a top view, on the line *o o*.
Figure 3:
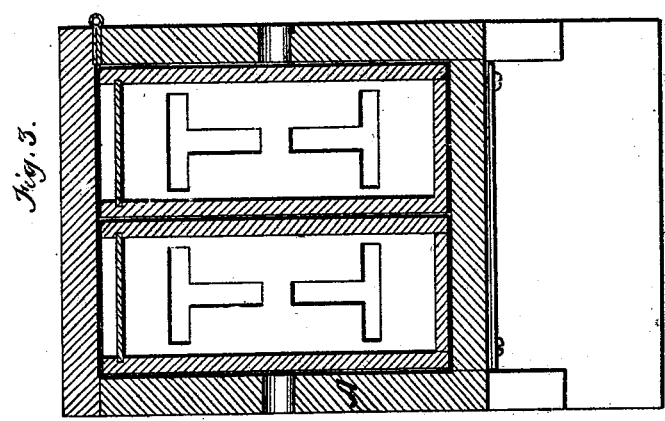
Figure 3 is a top view, on the red line *x x*.

It consists mainly in the construction and novel arrangement of devices intended to provide efficient means for preserving the honey intact while being removed from one hive to another; and also to provide novel means of access to the honey before such removal takes place.

The letter A, of the drawings, represents the shell or box of my bee-hive, and letter B the upper compartment thereof.

The compartment B has honey-drawers, with openings thereto, as shown, and is intended as a receptacle for small quantities of honey, removable at will, without disturbance to the main part of the hive.

The letters *c* represent a series of frames, arranged as shown, in the main hive, and resting upon the bed-plate thereof.

These frames are respectively attached to the bed-plate, and are made removable therefrom by the means following, namely:

At the rear of each frame I affix a rod, marked *n*, firmly into the bed-plate, and arrange it to stand firmly in a perpendicular position.

I attach to the rear ends of the frames respectively, hollow tubes, marked *s*, fitting loosely over the rods *n*, and adapted for removal therefrom at will.

These tubes are constructed of such length as to completely cover said rods when attached thereto.

The object of the arrangement last above named, is to provide means for detaching a frame, *c*, from the hive, without danger of breaking the comb of the honey attached thereto.

The box of the hive is made removable from the bed-plate and frames *c* in the manner following; that is to say, I cut grooves in the sides of the bed-plate, adapted to the size of the lower side pieces of the box. I attach hooks to the side pieces, as shown by the letter *u*, which clasp over the side and under the bottom of the bed-plate. This arrangement enables me to slide the main box backward from the bed-plate at will, leaving the frames all exposed and uncovered.

What I claim as my invention, and desire to secure by Letters Patent, is—

A bee-hive, having box A, with bed-plate as described, frames *c*, rods *n*, tubes *s*, and hooks *u*, constructed and arranged to operate substantially as described.

In testimony that I claim the above, I have hereunto subscribed my name in the presence of two witnesses.

JOSEPH CRONER.

Witnesses:
   J. A. M. REE,
   GEO. BUCHANAN.